(12) United States Patent
Lin et al.

(10) Patent No.: US 12,112,522 B2
(45) Date of Patent: Oct. 8, 2024

(54) DEFECT DETECTING METHOD BASED ON DIMENSIONALITY REDUCTION OF DATA, ELECTRONIC DEVICE, AND STORAGE MEDIUM

(71) Applicant: HON HAI PRECISION INDUSTRY CO., LTD., New Taipei (TW)

(72) Inventors: Tzu-Chen Lin, New Taipei (TW); Tung-Tso Tsai, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 436 days.

(21) Appl. No.: 17/587,086

(22) Filed: Jan. 28, 2022

(65) Prior Publication Data

US 2022/0254148 A1    Aug. 11, 2022

(30) Foreign Application Priority Data

Feb. 9, 2021    (CN) .......................... 202110183357.8

(51) Int. Cl.
*G06K 9/00* (2022.01)
*G06T 7/00* (2017.01)
(Continued)

(52) U.S. Cl.
CPC ........ *G06V 10/7747* (2022.01); *G06T 7/0006* (2013.01); *G06V 10/32* (2022.01); *G06V 10/758* (2022.01); *G06V 10/7715* (2022.01)

(58) Field of Classification Search
CPC .......... G06V 10/7747; G06V 10/7715; G06V 10/32; G06V 10/758; G06T 7/0006
See application file for complete search history.

(56) References Cited

U.S. PATENT DOCUMENTS

2012/0189176 A1*  7/2012  Giger .................. G06F 18/40
                                                  382/128
2022/0245801 A1*  8/2022  Gietzen ............... G06V 10/774

FOREIGN PATENT DOCUMENTS

CN          104867144          8/2015
CN          109978824          7/2019

OTHER PUBLICATIONS

Yang, Xi, et al. "Joint learning of unsupervised dimensionality reduction and gaussian mixture model." Neural Processing Letters 45 (2017): 791-806. (Year: 2017).*

(Continued)

*Primary Examiner* — Avinash Yentrapati
(74) *Attorney, Agent, or Firm* — ScienBiziP, P.C.

(57) ABSTRACT

A method for detecting product for defects implemented in an electronic device includes classifying a plurality of product images to be detected into linear images or non-linear images; performing dimension reduction processing on the product images after image classification according to a plurality of dimension reduction algorithms to obtain a plurality of dimension reduction data; determining an optimal dimension reduction data of the plurality of dimension reduction data; obtaining score data of the product image by inputting the optimal dimension reduction data into a Gaussian mixture model; comparing the score data with a threshold; determining whether the score data is less than the threshold; and determining that there is at least one defect in the product image in response that the score data is determined to be less than the threshold.

17 Claims, 3 Drawing Sheets

(51) Int. Cl.
  *G06V 10/32* (2022.01)
  *G06V 10/75* (2022.01)
  *G06V 10/77* (2022.01)
  *G06V 10/774* (2022.01)

(56) References Cited

OTHER PUBLICATIONS

Zong, Bo, et al. "Deep autoencoding gaussian mixture model for unsupervised anomaly detection." International conference on learning representations. 2018. (Year: 2018).*

* cited by examiner

DEFECT DETECTING METHOD BASED ON DIMENSIONALITY REDUCTION OF DATA, ELECTRONIC DEVICE, AND STORAGE MEDIUM

CROSS-REFERENCE TO RELATED APPLICATIONS

This application claims priority to Chinese Patent Application No. 202110183357.8 filed on Feb. 9, 2021, in China National Intellectual Property Administration, the contents of which are incorporated by reference herein.

FIELD

The subject matter herein generally relates to product detection, and particularly to a defect detecting method based on dimensionality reduction of data, electronic device, and storage medium.

BACKGROUND

Neural network models based on deep learning, such as a convolutional neural network, are widely used in artificial intelligence, which can realize automation of various functions, such as automatic detection and classification of data including modulation data and image data. When detecting defect signals in the image data, the convolutional neural network is usually required to be trained based on data sets, and perform feature extraction on a last convolutional layer in a training process, and then perform subsequent defect signal detection. However, when the original image data is similar, the extracted features will also be similar and are difficult to classify, thereby reducing a detection accuracy of the defect signals.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the presented disclosure.

The presented disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Figure 1:
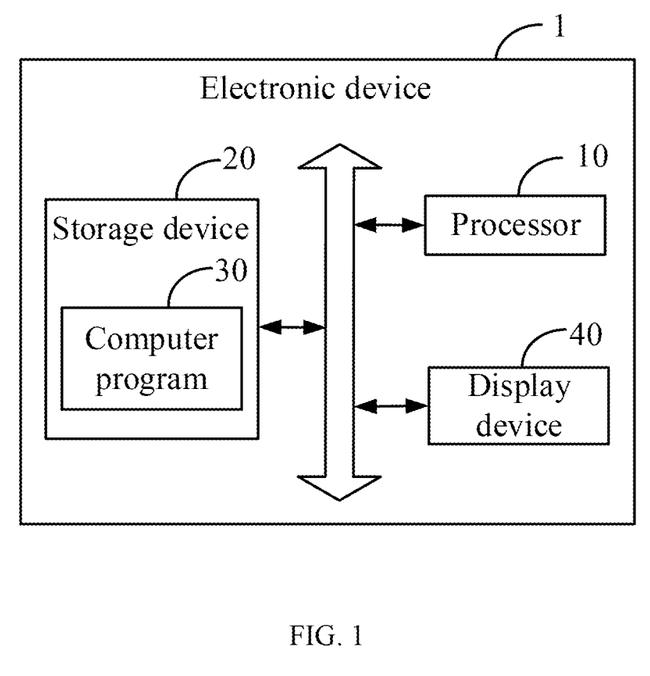
FIG. 1 is a block diagram of an embodiment of an electronic device according to the present disclosure.

Referring to FIG. 1, an electronic device (electronic device 1) is illustrated. In one embodiment, the electronic device 1 can be a personal computer, a server, and the like, the server can be a single server, a server cluster, or a cloud server. The network of the electronic device 1 includes, but is not limited to, Internet, wide area network, metropolitan area network, local area network, and virtual private network.

The electronic device 1 includes, but is not limited to, a processor 10, a storage device 20, a computer program 30, and a display device 40. The computer program 30 can be a defect detecting program. The computer program 30 may be executed by the processor 10 to implement a defect detecting method. FIG. 1 illustrates only one example of the electronic device 1. Other examples can include more or fewer components than as illustrated or have a different configuration of the various components in other embodiments.

The processor 10 can be a central processing unit (CPU), a microprocessor, or other data processor chip that performs functions in the electronic device 1.

In one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

The display device 40 can be a LCD (liquid crystal display) or an OLED (Organic Light Emitting Diode) screen.

Figure 2:
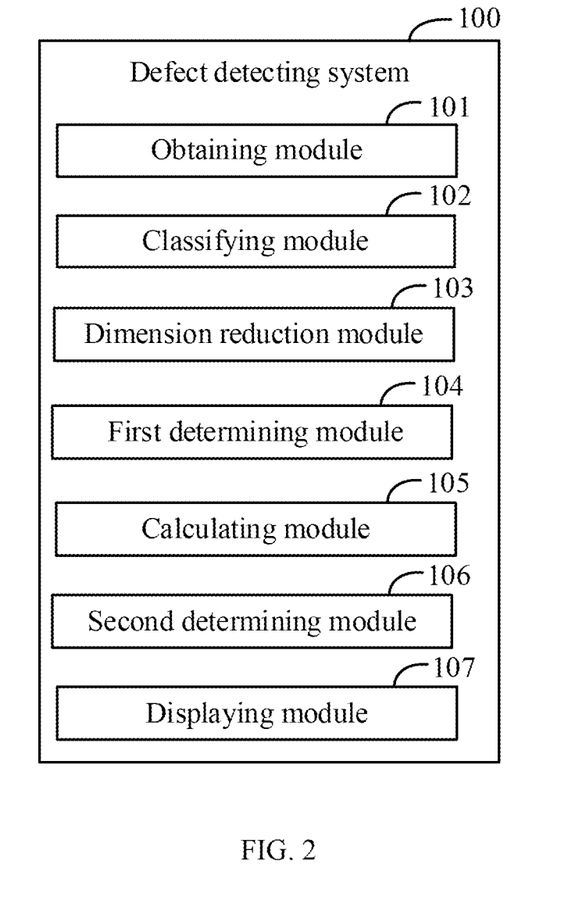
FIG. 2 is a block diagram of an embodiment of a defect detecting system according to the present disclosure.

As illustrated in FIG. 2, the electronic device 1 runs a defect detecting system 100. The defect detecting system 100 at least includes an obtaining module 101, a classifying module 102, a dimension reduction module 103, a first determining module 104, a calculating module 105, a second determining module 106, and a displaying module 107. The modules 101-107 can be collections of software instructions stored in the storage device 20 of the electronic device 1 and executed by the processor 10. The modules 101-107 also can include functionality represented by hardware or integrated circuits, or by software and hardware combinations, such as a special-purpose processor or a general-purpose processor with special-purpose firmware.

The obtaining module 101 is used to obtain at least one product image in response to a defect detection request.

In one embodiment, the defect detection request can be triggered by the user (for example, triggered by a preset function button), or it can be triggered automatically within a preset time.

In one embodiment, the defect detection request includes at least detection object information. In detail, the defect detection request is parsed to obtain the detection object information in the defect detection request, and the product image to be detected is obtained from the image database according to the detection object information. The detection object information may be a product name, a product model etc.

The classifying module 102 is used to classify a number of product images to be detected into linear images or non-linear images.

In one embodiment, the classifying module 102 performs normalization processing on the product images to be detected, inputs pixel value of each of the product images into a linear scoring function, to obtain a classification score respectively corresponding to the linear image and the non-linear image, and determines whether the classification score of the linear image is greater than the classification score of the non-linear image, and if the classification score of the linear image is determined to be greater than the classification score of the non-linear image, the product image is classified into the linear image, if the classification score of the linear image is determined to be not greater than the classification score of the non-linear image, the product image is classified into the non-linear image.

For example, the linear scoring function is $f(x_i, W, b)=Wx_i+b$. Each image data is assumed to be stretched into a column vector of length D, and a size is [D×1]. A matrix W with a size [K×D] and a column vector b with a size [K×1] are parameters of the linear scoring function, $x_i$ contains all pixel information of the i-th image, and the pixel information are stretched into a column vector with a size [p×1], the matrix W is [q×p] and the size of b is [q×1]. In the function, p is the number of pixels in the product image, and q is the number of categories. In one embodiment, the value of q is 2. Therefore, P numbers (original pixel values) are input to the linear scoring function, and the linear scoring function outputs 2 numbers (scores obtained by different categories), and then the scores of the different categories are compared. The parameter W is the weight, and b is a deviation vector.

The dimension reduction module 103 is used to perform dimension reduction processing on the product image after image classification according to a number of dimension reduction algorithms to obtain a number of dimension reduction data.

In one embodiment, if the product image is a linear image, the dimension reduction module 103 adopts a principal component analysis algorithm (PCA) and a random projection algorithm (Random Project) to reduce the dimension of the product image. If the product image is a non-linear image, the dimension reduction module 103 adopts an isometric mapping algorithm (Isomap) and a t-distributed random neighborhood embedding algorithm (t-SNE) to reduce the dimension of the product image.

In detail, if the principal component analysis algorithm is used for dimension reduction, the dimension reduction module 103 first subtracts sample average from sample data, then calculates principal component of the data by calculating data covariance matrix, and finally maps the data to the main component, the dimension of the product image can be reduced.

If the random projection algorithm is used for dimension reduction, the dimension reduction module 103 first selects a mapping matrix $R \in R^{K \times N}$, fills the mapping matrix with random numbers, normalizes each row in the mapping matrix, and then reduces the dimension of the data according to y=RX. X is the input data, and y is the data after dimension reduction.

If the equal-metric mapping algorithm is used for dimension reduction, the dimension reduction module 103 determines k-nearest neighbors of the product image pixel in the sample data, and sets the distance between the pixel and the k-nearest neighbor as the Euclidean distance, and the distance between the pixel and the k-nearest neighbor is set to infinity, calculates the distance between any two pixels using the shortest path algorithm, and the distance is taken as the input data of the multi-dimensional scaling analysis algorithm, projection in low-dimensional space is output according to the multi-dimensional scaling analysis algorithm, so as to obtain a reduced-dimensional image.

If the t-distributed random neighborhood embedding algorithm (t-SNE) is used for dimension reduction, the dimension reduction module 103 uses random adjacent embedding (SNE) to convert the sample data, that is, a high-dimensional Euclidean distance between the pixels of the product image to the conditional probability of similarity. For the low-dimensional corresponding points of the high-dimensional data points $X_i$ and $X_j$, the similar conditional probability is calculated, the KL distance is minimized according to the gradient descent method, and the perplexity is defined to obtain the corresponding low-dimensional data.

The first determining module 104 is used to determine an optimal dimension reduction data among the number of dimension reduction data.

In one embodiment, the determining module 104 calculates an average distance between the number of dimension reduction data obtained by each dimension reduction algorithm, and determines the number of dimension reduction data with the largest distance average value as the optimal dimension reduction data. It should be noted that the larger the distance between the dimension reduction data, the better the dimension reduction effect. In one embodiment, the distance between the number of dimension reduction data is the distance of the data point in the adjacency graph.

The calculating module 105 is used to obtain score data of the product image by inputting the optimal dimension reduction data into a Gaussian mixture model.

In one embodiment, the calculating module 105 performs average pooling processing on the optimal dimension reduction data to obtain a target vector, and then inputs the target vector into a pre-trained Gaussian mixture model to obtain the score data. The Gaussian mixture model can use a Gaussian probability density function (normal distribution image curve) to accurately quantify the score corresponding to the target vector.

In detail, the calculating module 105 determines the number of Gaussian mixture models in the Gaussian mixture model according to the number of types of defects to be detected, and calculates an expected value and the model parameter value of each iteration of the Gaussian mixture model according to the optimal dimension reduction data and the EM (Expectation-Maximum) algorithm, and calculates the optimal parameter of the Gaussian mixture model according to the expected value and model parameter value calculated in each iteration as the scoring data. In one embodiment, the number of Gaussian models in the Gaussian mixture model is two.

In one embodiment, the calculating module 105 may divide a training sample data into a training set, a test set, and a verification set, and then based on the maximum expectation algorithm, iteratively train multiple low-dimensional vectors in the training set to obtain learning machine, and then use the multiple low-dimensional vectors in the test set to test the learning machine to obtain the test result. If the test result is less than the configured value, the calculating module 105 adjusts the parameters in the learning machine according to the multiple low-dimensional vectors in the verification set, so as to obtain the pre-trained Gaussian mixture model. In one embodiment, the calculating module 105 calculates the number of the multiple low-dimensional vectors, and if the number is less than a preset number, the data enhancement algorithm is used to increase the number of the multiple low-dimensional vectors.

The second determining module 106 is used to compare the score data with a threshold, and determine whether the score data is less than the threshold.

In one embodiment, the threshold value is the difference between the mean value of the model parameter values calculated in each iteration and three times the standard deviation of the score data.

The first determining module 104 further determines that there is a defect in the product image when the score data is less than the threshold.

The first determining module 104 further determines that there is no defect in the product image when the scoring data is greater than or equal to the threshold.

The display module 107 is used to mark the defect area in the product image, and display the marked product image on the display device.

Figure 3:
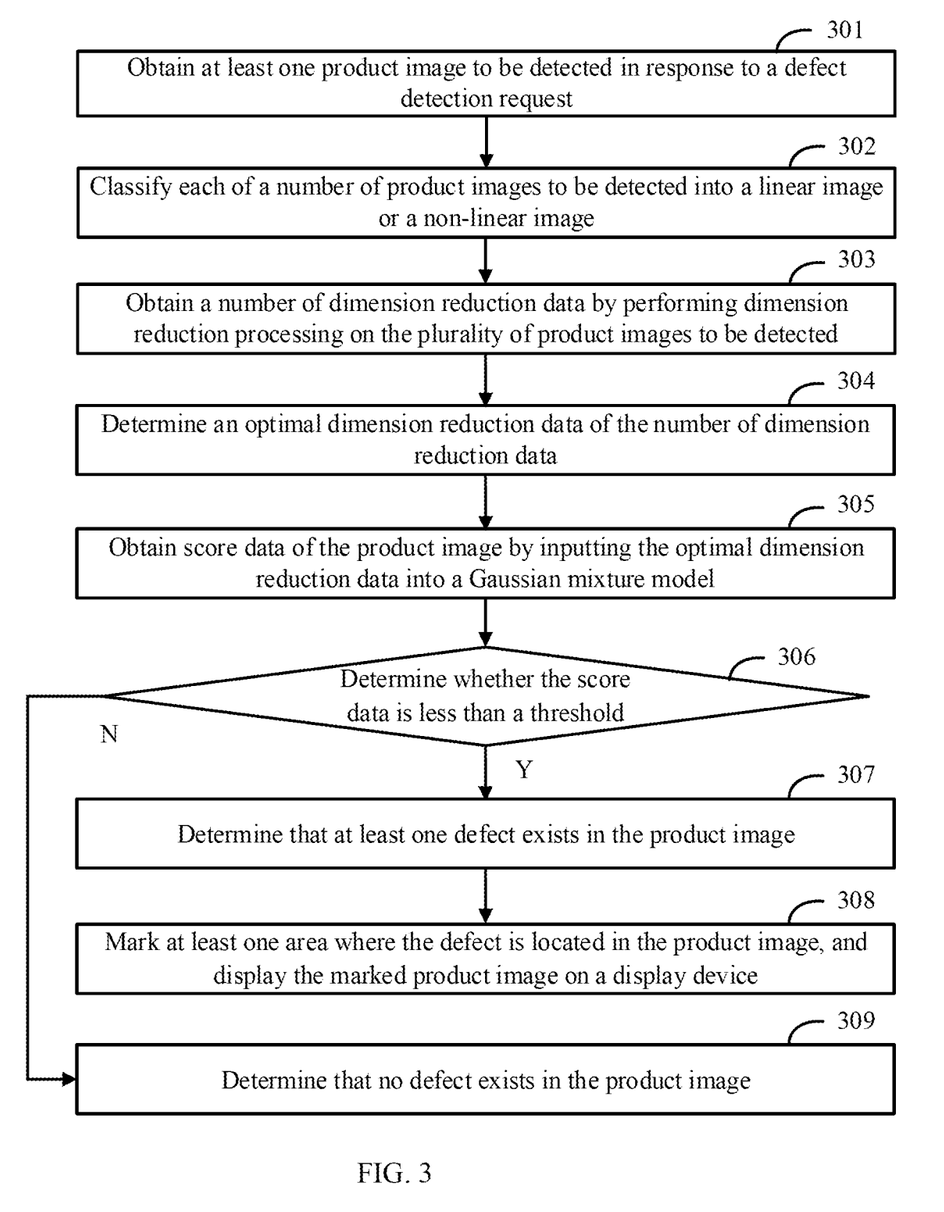
FIG. 3 illustrates a flowchart of an embodiment of a defect detecting method according to the present disclosure.

FIG. 3 illustrates a flowchart of an embodiment of a method for detecting product for defects. The method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 301.

At block 301, the obtaining module 101 obtains at least one product image to be detected according to a defect detection request when a defect detection request is received.

In one embodiment, the defect detection request can be triggered by the user (for example, triggered by a preset function button), or it can be triggered automatically within a preset time.

In one embodiment, the defect detection request includes at least detection object information. In detail, the defect detection request is parsed to obtain the detection object information in the defect detection request, and the product image to be detected is obtained from the image database according to the detection object information. The detection object information may be a product name, a product model etc.

At block 302, the classifying module 102 classifies a number of product images to be detected into linear images or non-linear images.

In one embodiment, the classifying module 102 performs normalization processing on the product images to be detected, inputs pixel value of each of the product images into a linear scoring function, to obtain a classification score respectively corresponding to the linear image and the non-linear image, and determines whether the classification score of the linear image is greater than the classification score of the non-linear image, and if the classification score of the linear image is determined to be greater than the classification score of the non-linear image, the product image is classified into the linear image, if the classification score of the linear image is determined to be not greater than the classification score of the non-linear image, the product image is classified into the non-linear image.

For example, the linear scoring function is $f(x_i, W, b)=Wx_i+b$. Each image data is assumed to be stretched into a column vector of length D, and a size is [D×1]. A matrix W with a size [KxD] and a column vector b with a size [Kx1] are parameters of the linear scoring function, $x_i$ contains all pixel information of the i-th image, and the pixel information are stretched into a column vector with a size [px1], the matrix W is [qxp] and the size of b is [qx1]. In the function, p is the number of pixels in the product image, and q is the number of categories. In one embodiment, the value of q is 2. Therefore, P numbers (original pixel values) are input to the linear scoring function, and the linear scoring function outputs 2 numbers (scores obtained by different categories), and then the scores of the different categories are compared. The parameter W is the weight, and b is a deviation vector.

At block 303, the dimension reduction module 103 performs dimension reduction processing on the product image after image classification according to a number of dimension reduction algorithms to obtain a number of dimension reduction data.

In one embodiment, if the product image is a linear image, the dimension reduction module 103 adopts a principal component analysis algorithm (PCA) and a random projection algorithm (Random Project) to reduce the dimension of the product image. If the product image is a non-linear image, the dimension reduction module 103 adopts an isometric mapping algorithm (Isomap) and a t-distributed random neighborhood embedding algorithm (t-SNE) to reduce the dimension of the product image.

In detail, if the principal component analysis algorithm is used for dimension reduction, the dimension reduction module 103 first subtracts sample average from sample data, then calculates principal component of the data by calculating data covariance matrix, and finally maps the data to the main component, the dimension of the product image can be reduced.

If the random projection algorithm is used for dimension reduction, the dimension reduction module 103 first selects a mapping matrix $R \in R^{K \times N}$, fills the mapping matrix with random numbers, normalizes each row in the mapping matrix, and then reduces the dimension of the data according to $y=RX$. X is the input data, and y is the data after dimension reduction.

If the equal-metric mapping algorithm is used for dimension reduction, the dimension reduction module 103 determines k-nearest neighbors of the product image pixel in the sample data, and sets the distance between the pixel and the k-nearest neighbor as the Euclidean distance, and the distance between the pixel and the k-nearest neighbor is set to infinity, calculates the distance between any two pixels using the shortest path algorithm, and the distance is taken as the input data of the multi-dimensional scaling analysis algorithm, projection in low-dimensional space is output according to the multi-dimensional scaling analysis algorithm, so as to obtain a reduced-dimensional image.

If the t-distributed random neighborhood embedding algorithm (t-SNE) is used for dimension reduction, the dimension reduction module 103 uses random adjacent embedding (SNE) to convert the sample data, that is, a high-dimensional Euclidean distance between the pixels of the product image to the conditional probability of similarity. For the low-dimensional corresponding points of the high-dimensional data points $X_i$ and $X_j$, the similar conditional probability is calculated, the KL distance is minimized according to the gradient descent method, and the perplexity is defined to obtain the corresponding low-dimensional data.

At block 304, the first determining module 104 determines an optimal dimension reduction data among the number of dimension reduction data.

In one embodiment, the determining module 104 calculates an average distance between the number of dimension reduction data obtained by each dimension reduction algorithm, and determines the number of dimension reduction data with the largest distance average value as the optimal dimension reduction data. It should be noted that the larger the distance between the dimension reduction data, the better the dimension reduction effect. In one embodiment, the distance between the number of dimension reduction data is the distance of the data point in the adjacency graph.

At block 305, the calculating module 105 obtains score data of the product image by inputting the optimal dimension reduction data into a Gaussian mixture model.

In one embodiment, the calculating module 105 performs average pooling processing on the optimal dimension reduction data to obtain a target vector, and then inputs the target vector into a pre-trained Gaussian mixture model to obtain the score data. The Gaussian mixture model can use a Gaussian probability density function (normal distribution image curve) to accurately quantify the score corresponding to the target vector.

In detail, the calculating module 105 determines the number of Gaussian mixture models in the Gaussian mixture model according to the number of types of defects to be detected, and calculates an expected value and the model parameter value of each iteration of the Gaussian mixture model according to the optimal dimension reduction data and the EM (Expectation-Maximum) algorithm, and calculates the optimal parameter of the Gaussian mixture model according to the expected value and model parameter value calculated in each iteration as the score data. In one embodiment, the number of Gaussian models in the Gaussian mixture model is two.

In one embodiment, the calculating module 105 may divide a training sample data into a training set, a test set, and a verification set, and then based on the maximum expectation algorithm, iteratively train multiple low-dimensional vectors in the training set to obtain learning machine, and then use the multiple low-dimensional vectors in the test set to test the learning machine to obtain the test result. If the test result is less than the configured value, the calculating module 105 adjusts the parameters in the learning machine according to the multiple low-dimensional vectors in the verification set, so as to obtain the pre-trained Gaussian mixture model. In one embodiment, the calculating module 105 calculates the number of the multiple low-dimensional vectors, and if the number is less than a preset number, the data enhancement algorithm is used to increase the number of the multiple low-dimensional vectors.

At block 306, the second determining module 106 compares the score data with a threshold, and determines whether the score data is less than the threshold.

In one embodiment, the threshold value is the difference between the mean value of the model parameter values calculated in each iteration and three times the standard deviation of the score data.

At block 307, the first determining module 104 further determines that there is a defect in the product image when the score data is less than the threshold.

At block 308, the display module 107 marks the defect area in the product image, and displays the marked product image on the display device.

At block 309, the first determining module 104 further determines that there is no defect in the product image when the scoring data is greater than or equal to the threshold.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
   at least one processor; and
   a storage device coupled to the at least one processor and storing instructions for execution by the at least one processor to cause the at least one processor to:
   classify each of a plurality of product images into a linear image or a non-linear image;
   obtain a plurality of dimension reduction data by performing dimension reduction processing on the plurality of product images by applying a plurality of dimension reduction algorithms;
   determine an optimal dimension reduction data of the plurality of dimension reduction data;
   obtain score data of each of the plurality of product images by inputting the optimal dimension reduction data into a Gaussian mixture model;
   determine whether the score data is less than a threshold; and
   determine that at least one defect exists in a corresponding product image of the plurality of product images in response that the score data is determined to be less than the threshold.

2. The electronic device according to claim 1, wherein the at least one processor is further caused to:
   determine that no defect exists in the corresponding product image in response that the score data is determined to be greater than or equal to the threshold.

3. The electronic device according to claim 1, wherein the at least one processor is further caused to:
   perform normalization processing on the plurality of product images;
   obtain a classification score respectively of the linear image and the non-linear image by inputting pixel values of each of the plurality of product images into a linear scoring function;
   determine whether the classification score of the linear image is greater than the classification score of the non-linear image;
   in response that the classification score of the linear image is determined to be greater than the classification score of the non-linear image, classify a corresponding product image of the plurality product images into the linear image; and in response that the classification score of the linear image is determined to be not greater than the classification score of the non-linear image, classify the corresponding product image into the non-linear image.

4. The electronic device according to claim 1, wherein the at least one processor is further caused to:

in response that the corresponding product image is a linear image, reduce dimension of the corresponding product image by applying a principal component analysis algorithm (PCA) and a random projection algorithm; and in response that the corresponding product image is a non-linear image, reduce dimension of the product image by applying an isometric mapping algorithm and a t-distributed random neighborhood embedding algorithm.

5. The electronic device according to claim 4, wherein the at least one processor is further caused to:

calculate an average distance between the plurality of dimension reduction data obtained by each dimension reduction algorithm; and determine the plurality of dimension reduction data with a greatest distance average value as the optimal dimension reduction data.

6. The electronic device according to claim 1, wherein the at least one processor is further caused to:

determine a number of Gaussian mixture models in the Gaussian mixture model according to a number of types of defects to be detected;

calculate an expected value and model parameter values of each iteration of the Gaussian mixture model according to the optimal dimension reduction data and an Expectation-Maximum (EM) algorithm; and calculate an optimal parameter of the Gaussian mixture model according to the expected value and the model parameter values calculated in each iteration as the score data.

7. The electronic device according to claim 6, wherein the threshold is a difference between a mean value of the model parameter values calculated in each iteration and three times a standard deviation of the score data.

8. The electronic device according to claim 1, wherein the at least one processor is further caused to:

mark at least one area where the at least one defect is located in the corresponding product image; and display the marked product image on a display device.

9. A defect detecting method based on dimensionality reduction of data implemented in an electronic device comprising:

classifying each of a plurality of product images into a linear image or a non-linear image;

obtaining a plurality of dimension reduction data by performing dimension reduction processing on the plurality of product images by applying a plurality of dimension reduction algorithms;

determining an optimal dimension reduction data of the plurality of dimension reduction data;

obtaining score data of the plurality of product image by inputting the optimal dimension reduction data into a Gaussian mixture model;

determining whether the score data is less than a threshold; and determining that at least one defect exists in a corresponding product image of the plurality of product images in response that the score data is determined to be less than the threshold.

10. The method according to claim 9, further comprising:

determining that no defect exists in the corresponding product image in response that the score data is determined to be greater than or equal to the threshold.

11. The method according to claim 9, wherein classifying a plurality of product images to be detected into linear images or non-linear images comprises:

performing normalization processing on the plurality of product images;

obtaining a classification score respectively of the linear image and the non-linear image by inputting pixel values of each of the plurality of product images into a linear scoring function;

determining whether the classification score of the linear image is greater than the classification score of the non-linear image;

in response that the classification score of the linear image is determined to be greater than the classification score of the non-linear image, classifying a corresponding product image of the plurality product images into the linear image; and in response that the classification score of the linear image is determined to be not greater than the classification score of the non-linear image, classifying the corresponding product image into the non-linear image.

12. The method according to claim 9, wherein performing dimension reduction processing on the product images after image classification according to a plurality of dimension reduction algorithms to obtain a plurality of dimension reduction data comprises in response that the corresponding product image is a linear image, reducing dimension of the corresponding product image by applying a principal component analysis algorithm (PCA) and a random projection algorithm; and in response that the corresponding product image is a non-linear image, reducing dimension of the product image by applying an isometric mapping algorithm and a t-distributed random neighborhood embedding algorithm.

13. The method according to claim 9, wherein determining an optimal dimension reduction data of the plurality of dimension reduction data comprises:

calculating an average distance between the plurality of dimension reduction data obtained by each dimension reduction algorithm; and determining the plurality of dimension reduction data with a greatest distance average value as the optimal dimension reduction data.

14. The method according to claim 9, wherein obtaining score data of the product image by inputting the optimal dimension reduction data into a Gaussian mixture model comprises:

determining a number of Gaussian mixture models in the Gaussian mixture model according to a number of types of defects to be detected;

calculating an expected value and model parameter values of each iteration of the Gaussian mixture model according to the optimal dimension reduction data and an Expectation-Maximum algorithm; and calculating an optimal parameter of the Gaussian mixture model according to the expected value and the model parameter values calculated in each iteration as the score data.

15. The method according to claim 14, wherein the threshold is a difference between a mean value of the model parameter values calculated in each iteration and three times a standard deviation of the score data.

16. The method according to claim 9, further comprising:

marking at least one area where the at least one defect is located in the corresponding product image; and displaying the marked product image on a display device.

17. A non-transitory storage medium having instructions stored thereon, when the instructions are executed by a processor of an electronic device, the processor is configured to perform a defect detecting method based on dimensionality reduction of data, wherein the method comprises:

classifying each of a plurality of product images into a linear image or a non-linear image;

obtaining a plurality of dimension reduction data by performing dimension reduction processing on the plurality of product images by applying a plurality of dimension reduction algorithms;

determining an optimal dimension reduction data of the plurality of dimension reduction data;

obtaining score data of the plurality of product image by inputting the optimal dimension reduction data into a Gaussian mixture model;

determining whether the score data is less than a threshold; and determining that at least one defect exists in a corresponding product image of the plurality of product images in response that the score data is determined to be less than the threshold.

* * * * *